Patented June 23, 1936

2,044,776

UNITED STATES PATENT OFFICE 2,044,776

METHOD OF MAKING ORGANIC ESTERS OF CELLULOSE

Camille Dreyfus, New York, N. Y., and George Schneider, Montclair, N. J., assignors to Celanese Corporation of America, a corporation of Delaware No Drawing. Application October 26, 1934, Serial No. 750,130

10 Claims. (Cl. 260—102)

This invention relates to the process of preparing organic esters of cellulose and relates more particularly to a method of preparing an organic ester of cellulose which, when formed into films, yields a product of good clarity and strength, which method may be carried out at room temperatures. This invention also relates to the process of preparing organic esters of cellulose wherein there is an economic recovery of chemical agents employed.

An object of this invention is the economic and expeditious production of organic esters of cellulose that form more clear and tough films and filaments of improved textile properties by a process that requires little or no cooling, that permits of an economic chemical recovery and that necessitates a less drastic stabilizing step than heretofore employed. Other objects of the invention will appear from the following detailed description.

In the process of preparing organic esters of cellulose, the esterification of the cellulose is usually conducted in the presence of a substantial amount of a diluent or solvent for the ester of cellulose being formed. Thus in preparing cellulose acetate, cellulose is acetylated by treatment with acetic anhydride and a catalyst, such as sulphuric acid, in the presence of an amount of glacial acetic acid as a solvent for the cellulose acetate that is formed. After acetylation, the excess anhydride is converted to the corresponding acid by the addition of water. A further amount of water may be added to allow the cellulose to ripen or to develop desired solubility characteristics.

After the desired solubility characteristics have been obtained, it has been the general practice to add a further amount of water or other non-solvent to the solution to cause a precipitation of the cellulose ester. The cellulose ester could then be separated from the dilute acid by filtering, decanting or otherwise. This method produced a large quantity of dilute acid which was very difficult to concentrate to a usable concentration.

We have found that instead of precipitating the cellulose acetate from solution by the use of a large quantity of water resulting in dilute acid solution we can, by special modifications of the normal method of preparing cellulose acetate, combine the ripening period with a distillation period whereby a large part of the acid is recovered in a concentration of 85% or higher, in which concentration it may be readily and inexpensively converted to glacial acetic acid.

By employing this invention there is an economy of time and space. Thus, instead of storing the ester for long periods of time for the purpose of ripening same to the desired solubility characteristics, the ripening and the distillation of acid out of the ripening mass may be made concurrently and at a great saving of time. Thus, the distillation and the hydrolysis may be so synchronized that after the desired quantity of acid is distilled off the reaction mass is ready for precipitation in a stable form.

Another advantage of this invention is the production of an exceedingly good quality of cellulose ester. Clearer and stronger articles are formed having an excellent stability. Another advantage of this invention is that elaborate cooling systems are not necessary. The acetylation may take place at room temperature. The hydrolysis or ripening may take place at room temperature and/or at distillation temperatures in a much shorter period of time than that normally required.

In accordance with our invention, then, we manufacture organic esters of cellulose by esterifying the cellulose and/or ripening the cellulose ester in an excess of acid over and above that normally required for esterification with a corresponding decrease in amount of sulphuric acid or its salts employed as catalyst. The ripening of the cellulose ester to the desired solubility is effected at least in part while distilling therefrom a substantial portion of the acid. The quantity of acid employed may be such that after the esterification of the cellulose, the esterification solution contains sufficient water for hydrolysis although the concentration of the acid is above 85%. Further, in accordance with our invention, we distil the cellulose esterification and/or ripening mixture and so regulate the amount of catalyst present that the viscosity and acetyl value of the resulting product are not abnormally reduced even when temperatures of over 100° C. are employed in the distillation.

Our invention may be employed in the making of any suitable organic ester of cellulose such as cellulose acetate, with particular respect to which it is here described, cellulose formate, cellulose propionate and cellulose butyrate. Cellulose in any suitable form such as cotton, cotton linters, wood pulp (either sulphite or soda pulp), reconstituted cellulose, etc., may be employed in making the cellulose ester. This cellulose may be activated by pretreatment with lower aliphatic acids or by treatment with alkali, etc. The esterifying agent may be acetic anhydride, formic acid, propionic anhydride, or butyric anhydride, depending upon the ester of cellulose to be formed. The esterification may be carried out in the presence of a suitable catalyst such as sulphuric acid, zinc chloride, sodium bisulphate, methyl sulphate or other suitable catalysts or mixtures of these. While we prefer to employ the acid corresponding to the anhydride employed thereby dispensing with the necessity in recovery processes of separating the acids, other suitable organic acids, such as propionic acid or butyric acid may be employed.

In carrying out our invention for the production of acetone soluble cellulose acetate, we prepare an organic ester of cellulose by acetylating cellulose in any suitable form by means of acetic anhydride in the presence of a suitable catalyst and glacial acetic acid as the solvent for the ester as it is formed. A large excess of glacial acetic acid above that normally employed or needed in normal practice, where cooling systems are used, is employed. Thus, for every 100 parts of cellulose employed or every 153 parts of cellulose acetate produced, there may be employed from 750 parts to over 1000 parts of glacial acetic acid. The amount of acetic anhydride employed may be substantially that normally required, i. e. from 200 parts to 250 parts for every 100 parts of cellulose employed.

The amount of catalyst employed will be dependent upon the amount of glacial acetic acid employed, the greater the quantity of glacial acetic employed, the smaller will be the amount of catalyst necessary for carrying out the process. In employing sulphuric acid as the catalyst and 750 parts of glacial acetic acid, the amount of catalyst required may be, for instance, from 10 to 7 parts to every 100 parts of cellulose, while employing when larger amounts of glacial acetic acid, say 1000 parts, the amount of catalyst required may be, for instance, from 5 to 8 parts to every 100 parts of cellulose. By employing a second catalyst, such as hydrochloric acid or a salt or compound thereof, as an aid to the sulphuric acid, the quantity of sulphuric acid may be still further decreased. Examples of such salts and compounds are zinc chloride, methyl chloride etc.

After acetylation sufficient water, for instance, from 20 to 30 parts to every 100 parts of cellulose, may be added to change any remaining acetic anhydride to the corresponding acid and to furnish the water for hydrolysis. As the quantity of acid is increased, the concentration thereof during ripening is greater than when a lesser quantity of acid is employed. In the process of this invention, the concentration of acid is above 85% and the same may be distilled off from the acetylating mixture directly and the distilled acid fractionally distilled to concentrate same, thus dispensing with expensive recovery systems. The concentrated acid may, with or without chemical purification, be employed in succeeding batches of material.

The distillation of the organic acid from the solutions of the cellulose esters may be carried out at any suitable temperature and at any suitable pressure ranging from superatmospheric pressures, through atmospheric pressure to absolute vacuum. However, we prefer to employ reduced pressure in order to lower the temperature at which the distillation is conducted and/or to shorten the time during which the ester is heated. If desired, air or any inert gas may be injected into the mass to assist the distillation and/or act as an agitator.

By regulating the amount of catalyst present during distillation, the desired degree of ripening may be had. For example, freshly acetylated cellulose of chloroform solubility after having had water added thereto, may be distilled direct with a slow neutralization of the catalyst as the acid is removed, to produce an acetone soluble cellulose acetate without any prolonged ripening period. For neutralizing the catalyst, any basic material may be employed. Thus, sodium acetate may be added to the mixture with agitation as the acid is distilled off. Other basic materials, such as the carbonate or bicarbonate of soduim, potassium, ammonium, or the sodium salt of the organic acid employed as diluent or solvent, or aluminum acetate, zinc or calcium carbonate or other like materials may be employed.

While all of the organic acid may be distilled completely from the esterifying mixture, we prefer to interrupt distillation while some of the acid still remains in the mixture, and preferably in such amounts as to maintain the cellulose ester in a viscose solution. The distillation is preferably interrupted at that point at which it contains an amount of acetic acid equivalent to the weight of anhydride employed. If the distillation is interrupted at this point, the ester may be precipitated by the addition of water to obtain any desired type of precipitate and the dilute acid decanted or drained therefrom may be processed to anhydride for a succeeding batch.

The organic acid recovered by the distillation process, which in general cases will be around 90% acid in water solution, may be purified in any suitable manner, such as by fractional distillation, and may then be employed in the manufacture or esterification of further amounts of cellulose or for any other purpose. The dilute acid drained from the precipitated ester may be processed by usual methods to the anhydride and also be used in the pretreatment and/or esterification of further amounts of cellulose.

It will be seen that by our process the organic acids employed as solvents or diluents in the esterification of cellulose or those acids formed during or after esterification of the cellulose may be recovered very economically. Moreover, the organic esters of cellulose, although formed at a great saving of time and at normal room temperatures, have improved properties in many respects and are not degraded in molecule size.

In order further to illustrate our invention, but without being limited thereto, the following specific example is given.

*Example I*

100 parts of cellulose, such as cotton linters, with or without previous preparation, such as activation with acid and/or alkalies, are added to a mixture containing 240 parts of acetic anhydride and 900 parts of glacial acetic acid, containing 5 to 8 parts sulphuric acid, the parts being by weight. The acetylation of the cellulose may be carried out at room temperature. After the reaction upon the cellulose is complete, 20 to 23 parts of water are added.

The mixture is then subjected to distillation at about 105° C. and sufficient vacuum is employed to cause a ready distillation of the liquid. As the liquid is distilled off, a small amount of sodium acetate may be added to reduce the amount of active catalyst present. The distillation is carried on preferably with stirring to prevent localized heating and to thoroughly mix in the alkaline material to "kill" the catalyst. The distillation is continued until substantially 80 parts or less of acetic acid remains in the mass.

The residue of the distillation, containing the cellulose acetate and some acetic acid, is then treated by an addition of water which is thoroughly mixed in, and the cellulose acetate that precipitates is removed from the dilute acetic acid and may be processed in any desired manner.

By a modified form of our invention, an additional amount of acid may be added to the esterification mixture just prior to distillation such that, although the same hydrolysis takes place, the sulphuric acid catalyst may be still further reduced. When large excesses of acid are employed in the esterification mixture, the amount of catalyst employed may be so small as to not require a stabilization step.

It is to be understood that the foregoing detailed description is merely given by way of illustration and many alterations may be made therein without departing from the spirit of our invention.

Having described our invention what we desire to secure by Letters Patent is:

1. Process for the manufacture of ripened organic esters of cellulose, which comprises esterifying cellulose by means of an aliphatic acid anhydride in the presence of a catalyst and aliphatic acid diluent, adding water to the resulting mixture, and distilling so as simultaneously to remove part of the aliphatic acid and ripen the cellulose ester present.

2. Process for the manufacture of ripened cellulose acetate, which comprises acetylating cellulose by means of acetic anhydride in the presence of a catalyst and acetic acid, adding water to the resulting mixture, and distilling so as simultaneously to remove part of the acetic acid and ripen the cellulose acetate present.

3. Process for the manufacture of ripened organic esters of cellulose, which comprises esterifying cellulose by means of an aliphatic acid anhydride in the presence of a catalyst and a large excess of aliphatic acid diluent, adding to the resulting mixture water in such an amount that a high concentration of aliphatic acid is still present, and distilling so as simultaneously to remove part of the aliphatic acid and ripen the cellulose ester present.

4. Process for the manufacture of ripened cellulose acetate, which comprises acetylating cellulose by means of acetic anhydride in the presence of a catalyst and a large excess of acetic acid, adding to the resulting mixture water in such an amount that a high concentration of acetic acid is still present, and distilling so as simultaneously to remove part of the acetic acid and ripen the cellulose acetate present.

5. Process for the manufacture of ripened organic esters of cellulose, which comprises esterifying cellulose by means of an aliphatic acid anhydride in the presence of a catalyst and a large excess of aliphatic acid diluent, adding to the resulting mixture water in such an amount that the aliphatic acid is present in a concentration above 85%, and distilling so as simultaneously to remove part of the aliphatic acid and ripen the cellulose ester present.

6. Process for the manufacture of ripened cellulose acetate, which comprises acetylating cellulose by means of acetic anhydride in the presence of a catalyst and a large excess of acetic acid, adding to the resulting mixture water in such an amount that the acetic acid is present in a concentration above 85%, and distilling so as simultaneously to remove part of the acetic acid and ripen the cellulose acetate present.

7. Process for the manufacture of ripened organic esters of cellulose, which comprises esterifying cellulose without cooling by means of an aliphatic acid anhydride in the presence of a catalyst and a large excess of aliphatic acid diluent, adding to the resulting mixture water in such an amount that a high concentration of aliphatic acid is still present, and distilling so as simultaneously to remove part of the aliphatic acid and ripen the cellulose ester present.

8. Process for the manufacture of ripened cellulose acetate, which comprises acetylating cellulose without cooling by means of acetic anhydride in the presence of a catalyst and a large excess of acetic acid, adding to the resulting mixture water in such an amount that a high concentration of acetic acid is still present, and distilling so as simultaneously to remove part of the acetic acid and ripen the cellulose acetate present.

9. Process for the manufacture of ripened organic esters of cellulose, which comprises esterifying cellulose without cooling by means of an aliphatic acid anhydride in the presence of a catalyst and a large excess of aliphatic acid diluent, adding to the resulting mixture water in such an amount that the aliphatic acid is present in a concentration above 85%, and distilling so as simultaneously to remove part of the aliphatic acid and ripen the cellulose ester present.

10. Process for the manufacture of ripened cellulose acetate, which comprises acetylating cellulose without cooling by means of acetic anhydride in the presence of a catalyst and a large excess of acetic acid, adding to the resulting mixture water in such an amount that the acetic acid is present in a concentration above 85%, and distilling so as simultaneously to remove part of the acetic acid and ripen the cellulose acetate present.

CAMILLE DREYFUS.
GEORGE SCHNEIDER.

CERTIFICATE OF CORRECTION.

Patent No. 2,044,776.  June 23, 1936.

CAMILLE DREYFUS, ET AL.

It is hereby certified that error appears in the printed specification of the above numbered patent requiring correction as follows: Page 2, first column, line 39, strike out the word "when" and insert the same before "employing" in same line; and that the said Letters Patent should be read with this correction therein that the same may conform to the record of the case in the Patent Office.

Signed and sealed this 25th day of August, A. D. 1936.

Leslie Frazer

Seal)

Acting Commissioner of Patents.